United States Patent [19]

Park et al.

[11] Patent Number: 5,683,253

[45] Date of Patent: Nov. 4, 1997

[54] DISK RECORDING MEDIUM AND VIDEO-SONG ACCOMPANIMENT APPARATUS ADOPTING THE SAME

[75] Inventors: Dong-jin Park; Kwang-sik Choi, both of Suwon, Rep. of Korea

[73] Assignee: Samsung Electronics Co., Ltd., Kyungki-do, Rep. of Korea

[21] Appl. No.: 470,616

[22] Filed: Jun. 6, 1995

[30] Foreign Application Priority Data

Aug. 30, 1994 [KR] Rep. of Korea .................. 94-21576

[51] Int. Cl.⁶ .................. G09B 5/08; G10H 1/36; G10H 1/40
[52] U.S. Cl. .................. 434/307 A; 434/318; 84/645; 84/666; 369/32; 369/47
[58] Field of Search .................. 434/118, 307 R, 434/309, 318, 365; 348/478, 484, 571, 595, 738; 369/32, 47, 48, 50; 84/423 R, 454, 477 R, 601, 609–611, 615, 625, 645, 666; 360/19.1, 33.1, 77.01; 358/310, 311, 341, 342, 335

[56] References Cited

U.S. PATENT DOCUMENTS

5,546,368  8/1996  Lee et al. .................. 369/32 X
5,561,649  10/1996  Lee et al. .................. 369/32 X
5,611,693  3/1997  Chaya et al. .................. 434/307 A

Primary Examiner—Joe Cheng
Attorney, Agent, or Firm—Sughrue, Mion, Zinn, Macpeak & Seas, PLLC

[57] ABSTRACT

A song program and a motion picture background image suitable for the mood of the song program are recorded on a recording medium. A video-song accompaniment apparatus employs the recording medium to reproduce the song program and the motion picture background image. The recording medium has a lead-in area, a program area and a lead-out area. The recording medium includes a first disk which has a first area for storing a song program index table containing the index information of a song program for accompaniment in the program area, a second area for storing a background image index table containing the index information of a motion picture background image, a third area for storing a song program containing accompaniment data, lyric data and class number for each song program, and a fourth area for storing a video program containing the index numbers of the motion picture background image written on the first disk; and a second disk for recording on a program area thereof the motion picture background images for accompaniment corresponding to the class number written on the first disk.

10 Claims, 8 Drawing Sheets

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| 1 | CONTROL | | | POINTER | | ADDRESS | | | TRACK NUMBER (TNR) | | | | | | |
| 17 | SEC | | | | | | | | MIN | | | | | | |
| 33 | ZERO | | | | | | | | FRAME | | | | | | |
| 49 | PSEC | | | | | | | | PMIN | | | | | | |
| 65 | | | | | | | | | PFRAME | | | | | | |
| 81 | CRC CODE | | | | | | | | | | | | | | |

| FRAME NUMBER | POINTER | P MIN | P SEC | P FRAME |
|---|---|---|---|---|
| n | 01 | | | |
| n+1 | 01 | BEGINNING ADDRESS OF SONG PROGRAM TABLE TRACK | | |
| n+2 | 01 | | | |
| n+3 | A0 | | | |
| n+4 | A0 | BEGINNING ADDRESS OF FIRST TRACK IN PMA | | |
| n+5 | A0 | | | |
| n+6 | A1 | | | |
| n+7 | A1 | BEGINNING ADDRESS OF LAST DATA TRACK IN PMA | | |
| n+8 | A1 | | | |
| n+9 | A2 | | | |
| n+10 | A2 | BEGINNING ADDRESS IN LOA | | |
| n+11 | A2 | | | |

FIG. 5

| INDEX | AMIN | ASEC | AFLAME |
|---|---|---|---|
| 0001 | BEGINNING ADDRESS OF D1 | | |
| 0002 | BEGINNING ADDRESS OF D2 | | |
| ⋮ | ⋮ | | |
| 9999 | BEGINNING ADDRESS OF Dn | | |

FIG. 6

| BACKGROUND IMAGE | AMIN | ASEC | AFLAME |
|---|---|---|---|
| 0001 | BEGINNING ADDRESS OF P1 | | |
| 0002 | BEGINNING ADDRESS OF P2 | | |
| ⋮ | ⋮ | | |
| 0040 | BEGINNING ADDRESS OF Pq | | |

FIG. 7

| PROGRAM INDEX | AMIN | ASEC | AFLAME |
|---|---|---|---|
| 0001 | BEGINNING ADDRESS OF PM1 | | |
| 0002 | BEGINNING ADDRESS OF PM2 | | |
| ⋮ | ⋮ | | |
| 1999 | BEGINNING ADDRESS OF PMm | | |

DISK RECORDING MEDIUM AND VIDEO-SONG ACCOMPANIMENT APPARATUS ADOPTING THE SAME

BACKGROUND OF THE INVENTION

1. Field of the Invention

The present invention relates to a video-song accompaniment apparatus, and more particularly, to a disk recording medium and a video-song accompaniment apparatus adopting the same in which song lyrics and motion picture background images are displayed by reproducing signals written on the recording medium.

2. Description of Related Art

A video-song accompaniment apparatus, commonly called a karaoke machine, enables a user to enjoy singing along with a song accompaniment while viewing displayed song lyrics and a background image on a display device. It is a recent trend that video-song accompaniment apparatuses are broadly provided not only for commercial use but even for home use. Among such video-song accompaniment apparatuses are a laser disk (LD) karaoke machine using a laser disk, a computer karaoke machine using a semiconductor memory device, and a compact disk graphics (CDG) karaoke machine using a compact disk.

The LD karaoke machine not only provides high quality video and audio by outputting a video signal and a character signal, written on the laser disk, to a screen and outputting an audio signal to an audio apparatus, but also provides a moving-picture background image corresponding to the mood of a given song. However, the number of programs contained in a laser disk is limited to about thirty songs because, besides the audio signal, the motion picture takes up a great deal of the available data space. Hence, to obtain more than 2,000 programs (common for commercial use), about seventy laser disks are needed. Such a large quantity of laser disks presents a cost burden, and also the frequent changing of disks for selecting songs is cumbersome. On the other hand, a laser disk changer may be installed, but such a device occupies a large mount of space, searches at a slow speed, and is very costly.

The CDG karaoke machine provides the video, lyrics and music simultaneously by reproducing a compact disk which contains still pictures and character data using a sub-code. The CDG karaoke machine has been broadly provided for home use, more so than the LD karaoke machine, due to smaller disks and a lower purchase price per disk. However, the CDG karaoke machine cannot reproduce a motion picture signal and provides a rather low-quality video image, as well. Further, the CDG-type disk contains only about fifteen songs per disk, therefore, many such disks are needed to provide a large program selection. Thus, the inconvenience of frequently having to change disks is even worse than in the case of the LD karaoke machine.

The computer karaoke machine stores song accompaniment data and lyric data on a semiconductor memory element according to a musical instrument digital interface (MIDI) data format, displays character data on a screen of a video display device by reading out the relevant MIDI data according to a song selection, and outputs song accompaniment data through a sound source processor. Here, since MIDI data is recorded instead of the audio sampling data of an LD or CDG karaoke machine, the computer karaoke machine has the ability of writing 1,000 to 1,500 various programs on a single memory element. Moreover, the apparatus enjoys rapid searching for a song selection because disk changes are not necessary, and the song selection operation is available through the memory accessing function of a central processor. However, memory capacity is limited, so that unlike the LD karaoke machine, a background image relative to the song lyrics cannot be provided, and expensive cost outlays are required for any memory extension to achieve a greater degree of song selection. Besides, the sound quality is worse than that of either the LD or CDG karaoke machine.

SUMMARY OF THE INVENTION

To solve the above problems, it is an object of the present invention to provide a disk recording medium for use in a video-song accompaniment apparatus, which consists of a matched pair of disks, on one of which thousands of song programs can be written and on the other of which motion picture background images can be written.

It is another object of the present invention to provide a video-song accompaniment apparatus adopting the above recording medium, which reproduces various images according to the mood of a song, by way of a simple structure.

It is still another object of the present invention to provide a video-song accompaniment apparatus adopting the above recording medium, which does not require a high-priced disk changer.

Accordingly, to achieve the first object, a disk recording medium according to the present invention comprises: a first disk including, in a program area, a first area for a song program index table containing the index information of a song program for accompaniment, a second area for a background image index table containing the index information of motion picture background images related to said song programs, a third area for a song program containing accompaniment data, lyrics data and a class number according to the mood of a song, by the unit of a song, and a fourth area for a video program containing the index numbers of the motion picture background images; and a second disk in which plural motion picture background images for an accompaniment corresponding to the class number written on said first disk are recorded on a program area.

To achieve a second object, a video-song accompaniment apparatus according to the present invention comprises: a first reproducer for reproducing a song program corresponding to a selected song from a first disk containing plural song programs for accompaniment; a second reproducer for reproducing a motion picture background image corresponding to the selected song from a second disk containing plural motion picture background images for accompaniment; a memory in which a song program index table, a video program index table, a song program and a video program, all reproduced by the first reproducer, are recorded; an accompaniment signal generator for generating an accompaniment signal according to lyrics data among the song program written in the memory, and then provides the signal to a speaker; a subtitle signal generator for generating a subtitle signal according to the lyrics data among the song programs written in the memory; a mixer for mixing the background image signal reproduced by the second reproducer and the subtitle signal generated from the subtitle signal generator, and providing the mixed result to a video output device; a key input portion which generates a key signal for a song selection; and a controller which stores in the memory the song program index table, the video program index table, the song program and the video program, all reproduced by the first reproducer, and reads out the accompaniment data and the lyrics data stored in the memory, to provide the read-out data to the accompaniment signal generator and the subtitle signal generator, respectively, and at the same time, by controlling the second reproducer, reproduces a background image corresponding to the background image number.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

The recording area of a compact disk or laser disk is divided into a program area (PMA) containing a plurality of song programs, a lead-in area (LIA) containing index information of the plurality of song programs included in the PMA, and a lead-out area (LOA) in which signals indicating an end area of the disk are written.

Figure 1:
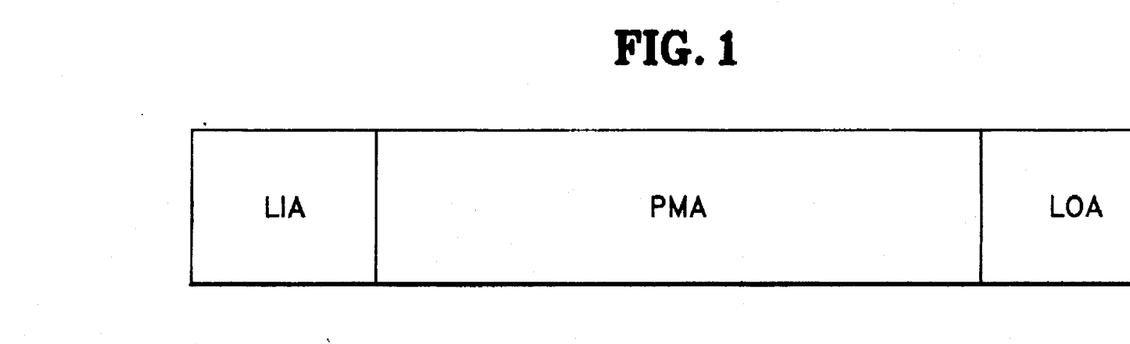
FIG. 1 is a view illustrating a video signal format contained in the program area of a laser disk.

FIG. 1 shows a video signal contained in the PMA of a laser disk. In the case of a laser disk, the video signal is recorded in units of chapters. In the LIA, a 24-bit bi-phase signal 88FFFFh, which indicates the start of a program, is inserted on horizontal scanning lines 17, 18, 280 and 281. In the LOA, a 24-bit bi-phase signal 80FFFFh is recorded on horizontal scanning lines 17, 18, 280 and 281. The chapter number (whose form is 8X1X2DDD) is recorded on horizontal scanning lines 17, 18, 280 and 281.

Here, the pattern X1X2S is a binary-coded decimal (BCD) code indicating the chapter number and includes successive numbers from 00 to 79. The chapter number must be recorded successively on more than thirty tracks. The reproducing time of a laser disk is a maximum of 120 minutes, so given a three-minute average playing time for any song, background images for about forty songs can be recorded on one laser disk. Hence, the number of background images needed to be stored on a laser disk, is accommodated by the number of chapters that can be represented in a laser disk.

Figure 2:
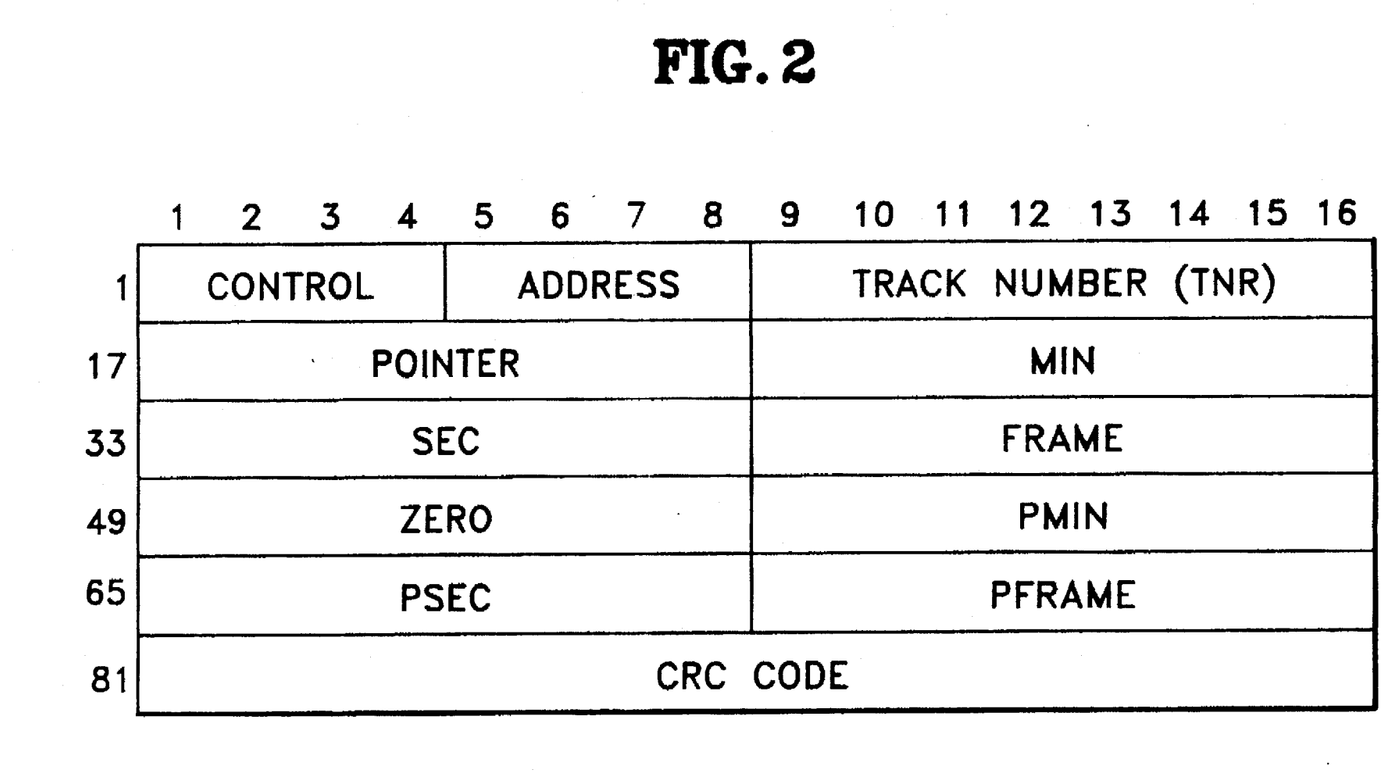
FIG. 2 is a view illustrating the data contained in a sub-code channel 0 in the lead-in area of a compact disk.

FIG. 2 shows the data structure of channel 0 in the LIA of a compact disk. In the LIA of a compact disk, a table of contents (TOC) having performance information relating to programs contained in the PMA is recorded on the 98-bit channel Q data structure which is composed of second bits in a sub-channel among a 98-frame data bit sequence. The bit sequence for the 98-bit channel Q data structure is composed of a 2-bit synchronization signal, a 4-bit control signal, a 4-bit address signal, and a 72-bit data signal. The 72-bit data signal is composed of an 8-bit track number (TNR), an 8-bit pointer, a 24-bit address (minutes, seconds and frame), an 8-bit interval (zero), and a 24-bit pointer address. Since the 8-bit track number code is represented as a BCD code, a track number code can only be designated from 01 to 99. Hence, a maximum of 99 programs can be expressed, and no more than 100 programs can be designated in the TOC.

Figure 3A:
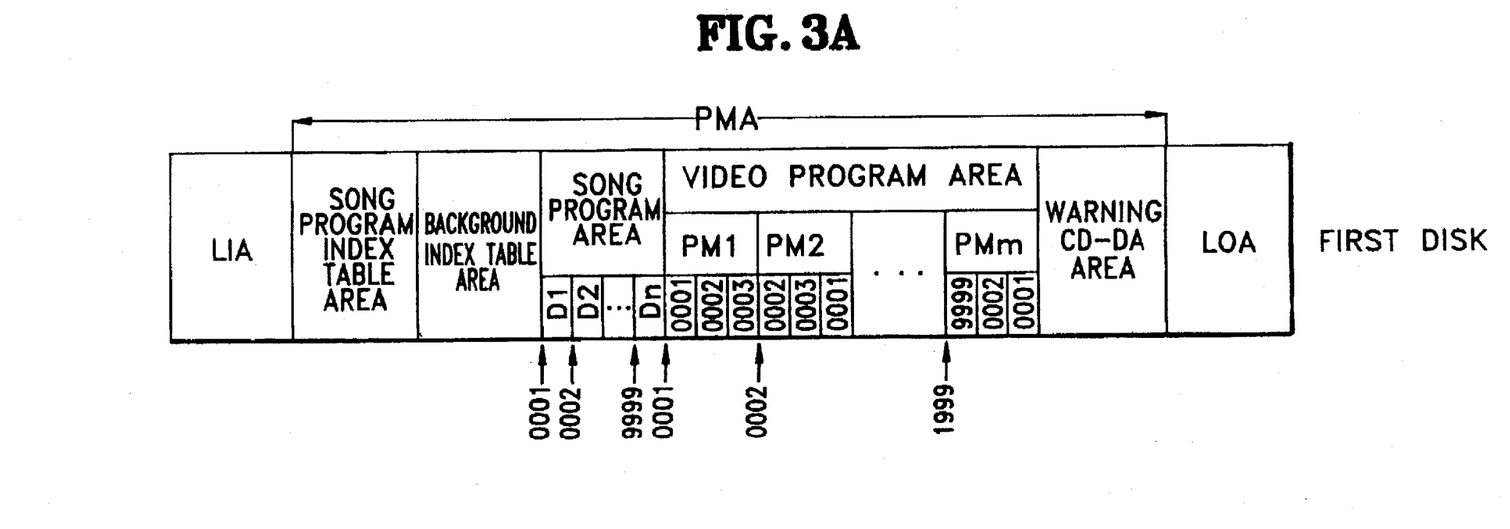
FIGS. 3A and 3B are views illustrating a recording area on a recording medium according to the present invention.
Figure 3B:
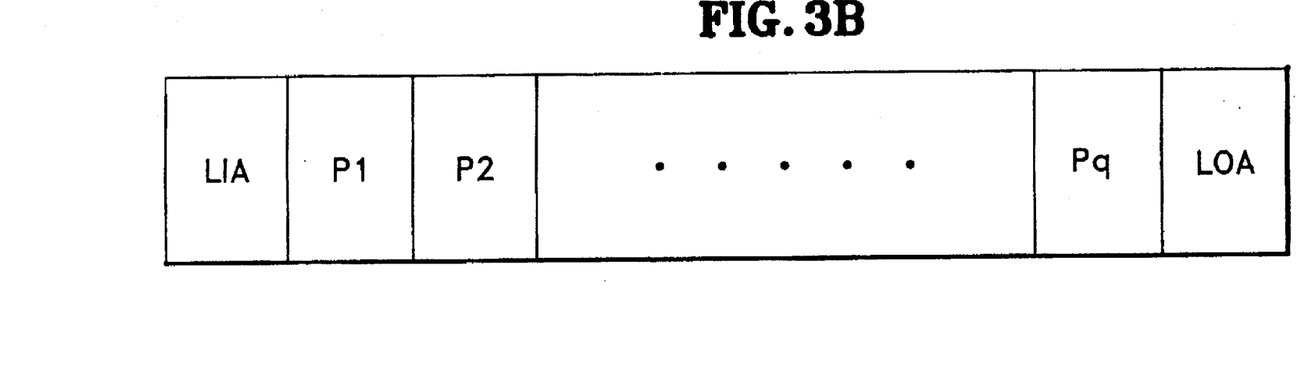

FIG. 3 shows the data recording areas of the first and second disks according to the present invention. The first disk includes, all in the PMA, a song program area, a song program index table area, a video program area, and a background index table area. The first disk contains, in the above areas, more than thousands of song programs for an accompaniment, a song program index table, scores of video programs having class numbers classified by a mood of a song and index numbers of background images corresponding to the classifying numbers, and a background index table for an accompaniment.

The second disk has an LIA, LOA, and PMA, where a plurality of motion picture background images, written in units of chapters, are contained in the PMA. Each leading address of the motion picture background images is written in the TOC in the LIA along with an index number.

Figure 4:
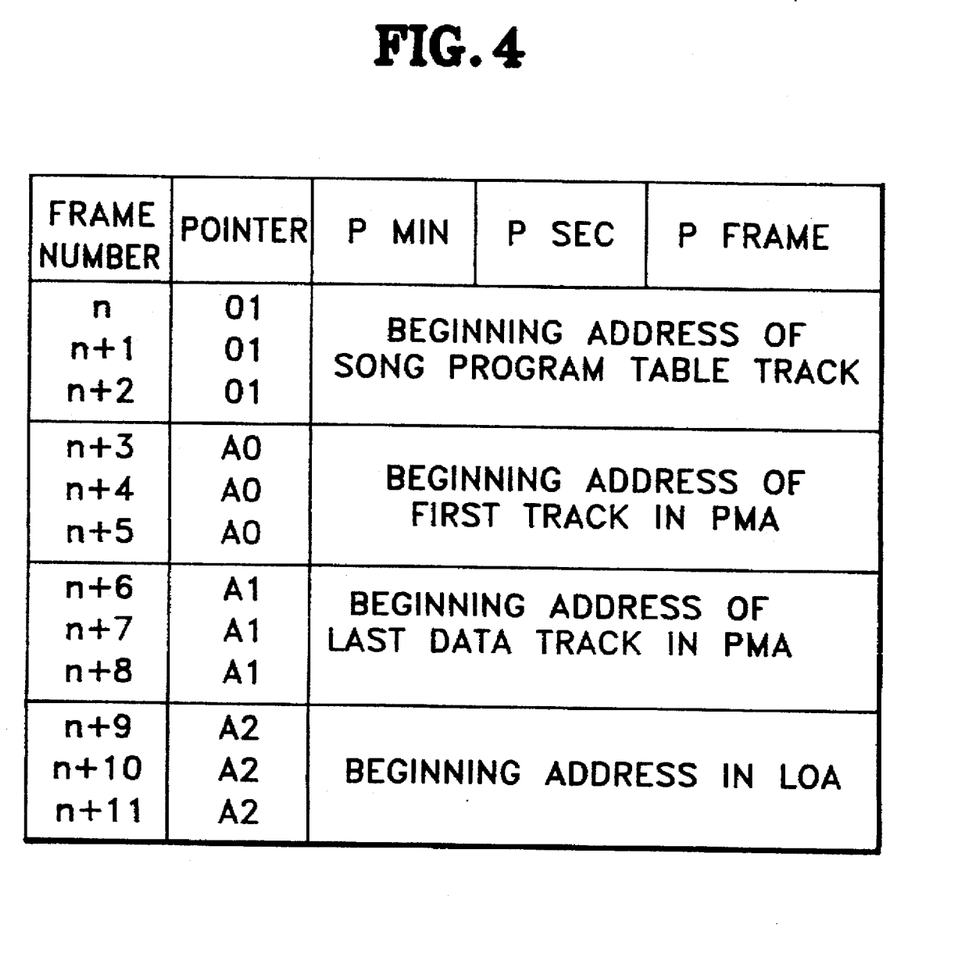
FIG. 4 is a view illustrating the table of contents of the first disk shown in FIG. 3.

FIG. 4 shows a TOC of the first disk according to the present invention. A TOC pointer value of 01 indicates the start address of a song program index table area. The pointer values A0, A1, and A2 respectively indicate the first track number of a program area, the last track number of a program area, and the start address of the LOA.

Any other TOC pointer value, except A0, A1, and A2 in the first disk recording medium according to the present invention, can be interchangeable, according to a track arrangement in the PMA. However, it is desirable to locate both the song program index table area and the video program index table area near the LIA to enhance the search speed or the servo movement in a reproducing portion.

Figure 5:
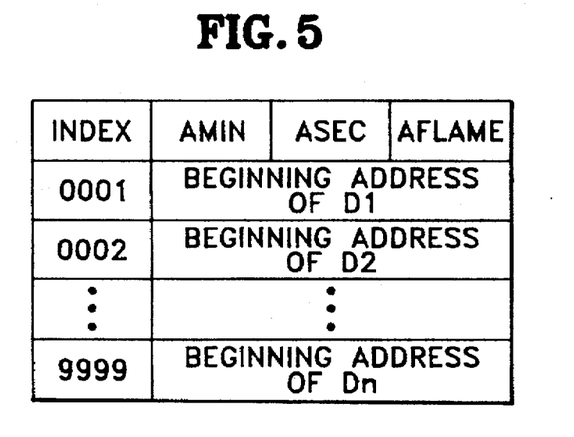
FIG. 5 is a view illustrating the information written in a song program index table of the first disk shown in FIG. 3.

The PMA in the first disk according to the present invention is essentially divided into five areas. The first area contains the song program index table shown in FIG. 5, which is a table comprised of a song number for an accompaniment and the start address information for the corresponding song.

Figure 6:
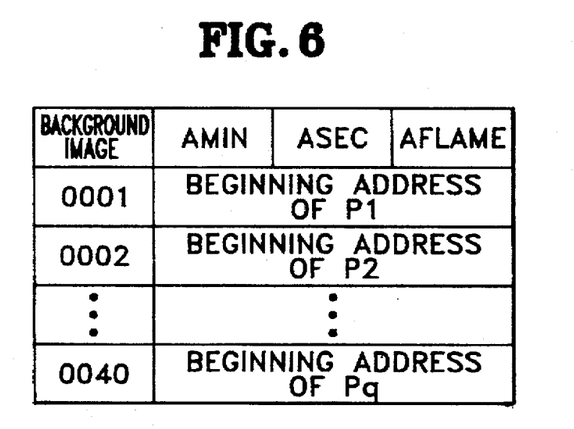
FIG. 6 is a view illustrating the information written in a background image index table area of the first disk shown in FIG. 3.

The second area of the PMA of the first disk is for recording the background image index table shown in FIG. 6, which is a table comprised of an index number of a motion picture background image written on the second disk and of a leading chapter number. The table has the same contents as the TOC of the LIA of the second disk.

The third area of the PMA of the first disk contains a song program comprised of accompaniment data, lyrics data and a class number, recorded in units of chapters. The class number refers to the number of a group to which a song program belongs. Here, the song program is classified into groups according to the mood of the song (e.g., two or three types of such "moods").

Figure 7:
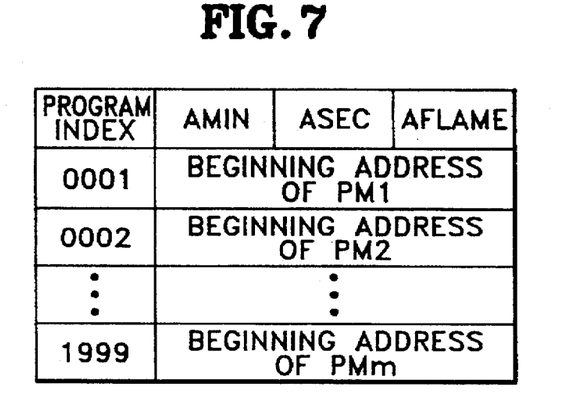
FIG. 7 is a view illustrating the information written in a video program area shown in FIG. 3.

The fourth area is for recording a video program shown in FIG. 7, which is a program in which the index number of a motion picture background image is written on the second disk, according to class number. Various kinds of background images can be matched with a class number, therefore, the index number must be recorded on the video program in order to be referred to during reproduction of the song program.

Figure 8:
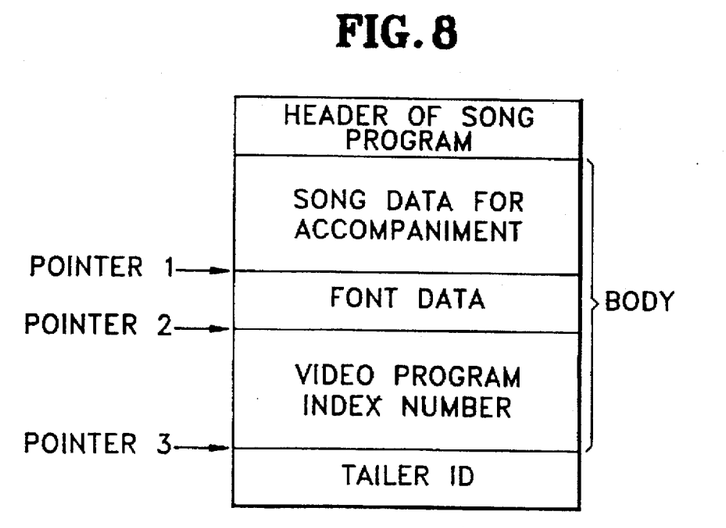
FIG. 8 is a view illustrating the information of a song program written in a song program area of the first disk shown in FIG. 3.

FIG. 8 shows a data structure of a song program stored in the third area. A header of a song program shown in FIG. 8 has information such as a header ID code, header size, body size, pointers 1, 2 and 3, and total size. The body is largely composed of song data for accompaniments, lyric data and a video program index number. This data is written in a MIDI data format, and pointer 1 of a header designates the start address of font data. Pointer 2 designates the start address of a video program index number, and pointer 3 designates the start address of a tailer.

Figure 9:
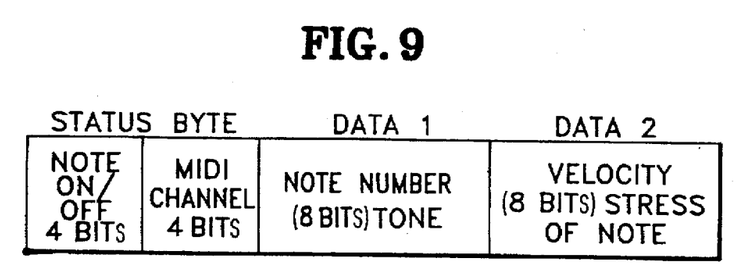
FIG. 9 is a view illustrating the structure of a MIDI on/off message.

In an embodiment according to the present invention, a song program for accompaniment is comprised of MIDI data, as shown in FIG. 9. The MIDI signal format is shown in Table 1.

TABLE 1

|  |  | STATUS BYTE | NUMBER OF DATA BYTES |
|---|---|---|---|
| CHANNEL MESSAGE | Note OFF | 8X | 2 |
|  | Note ON | 9X | 2 |
|  | Poly Phonic Key Pressure | AX | 2 |
|  | Control Change | BX | 2 |
|  | Program Pressure | CX | 1 |
|  | Channel Pressure | DX | 1 |
|  | Pitch Foil Change | EX | 2 |
| SYSTEM MESSAGE | Exclusive Change | F0 | arbitrary |
|  | Cutter Frame Change | F1 | 1 |
|  | Song Position Pointer | F2 | 2 |
|  | Song Selector | F3 | 1 |
|  | Tune Request | F6 | nonexisting |
|  | End of Exclusive | F7 | nonexisting |
|  | Timing Clock | F8 | nonexisting |
|  | Start | FA | nonexisting |
|  | Continue | FB | nonexisting |
|  | Stop | FC | nonexisting |
|  | Active Sensing | FE | nonexisting |
|  | System Reset | FF | nonexisting |

The MIDI signal is composed of one status byte and zero or more data bytes. The MIDI signal is generally divided into a channel message and a system message in accordance with a status byte. The channel message is divided into a voice message and a mode message, and the system message is divided into an exclusive message, a common message, and a real-time message.

A note on/off message contains information regarding note generation with a certain tone level among 128 tone levels, and a certain stress level among 128 stress levels, as shown in FIG. 9. The MIDI format in a conventional computer karaoke mode can be applied to accompaniment data and lyric data according to the present invention. A class number, which is a video program index number designating the classification of a background image for a given song, is contained in each song program using the system exclusive message. The synchronization of the accompaniment data and the lyric data is accomplished by using a MIDI time code.

A header frame message, a full time code message, a user bit message, and a set-up message are all used for the MIDI time code. Also, a font and an image can be synchronized by inserting control data in the accompaniment data. For example, as shown in FIG. 9, an ID code of a manufacturer and a flag code can be included by using the exclusive message.

Figure 10:
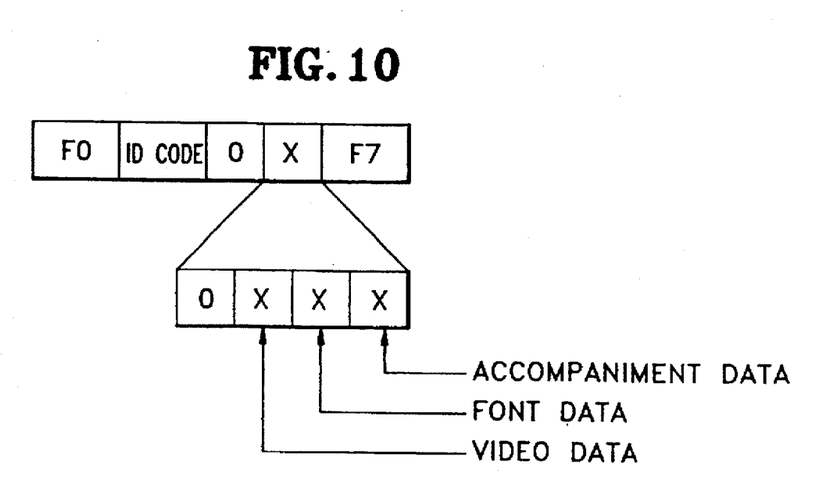
FIG. 10 is a view illustrating the structure of a MIDI exclusive message.

In FIG. 10, a flag code (OX) is used for a data byte, the least significant bit among the following four bits is used as an accompaniment data effective flag, and the second bit is used as a font data output flag.

The fifth area of the PMA of the first disk contains a vocal or written (CDG-type character) warning message. For example: "This disk is for video-song accompaniment, to be used exclusively with a Samsung player."

A compact disk can hold about 640 megabytes (Mb) of information when the maximum reproducing time is 75 minutes. On the first disk according to the present invention, at most about 12,800 songs can be contained. Supposing the size of a song program is about 50 kilobytes (Kb), 12,800 (640 Mb/50 Kb) songs can be contained on the first disk, but in order to have surplus data, only about 12,000 songs can be contained on the disk recording medium. A song program index table occupies 48 Kb (12,000 songs×4 bytes/song), and a background image index table occupies 160 bytes (40×4 bytes/song). Supposing a video program has 100 class numbers and one class number has four background image numbers, then 1.6 Kb (100×4×4) are required. Hence, the total information amount in the first and second area is 600.04976 Mb (600 Mb+48 Kb+160 bytes+1.6 Kb).

Figure 11:
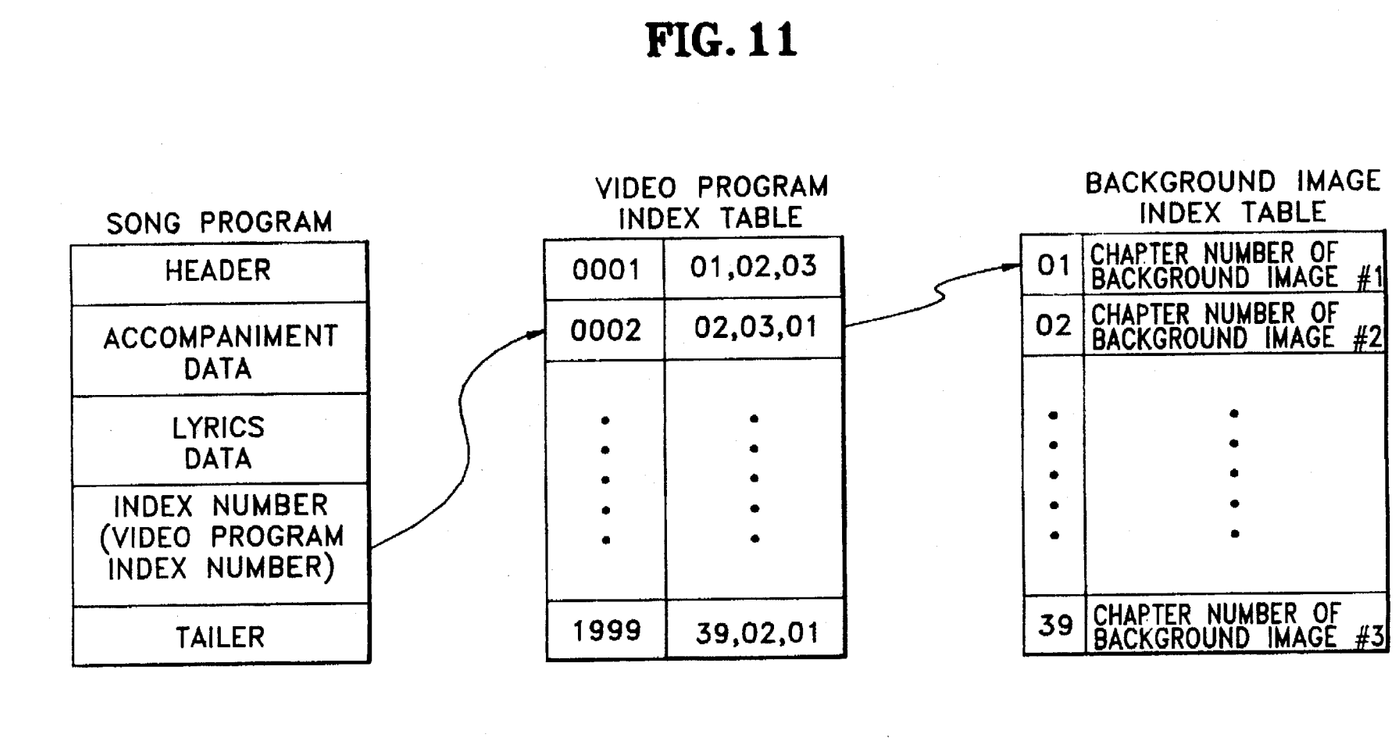
FIG. 11 is a view illustrating the relationship between a video program index code and a background image in a disk recording medium shown in FIG. 3.

FIG. 11 shows an interrelation between a song program written on a first disk and a background image written on a second disk. As shown in FIGS. 8 and 11, the song program written on the first disk has a class number, i.e., an index number of a video program. The background image number contained in the video program index table for that particular class number, is an index number of a motion picture background image written on the second disk. During reproduction of an accompaniment signal, referring to the class number written on the song program, one or more index numbers of background images can be obtained and one of these index numbers is reproduced.

Also, whenever a video program is selected, the background images annexed to the video program can be shuffled. That is, if the same song program is selected again, the background image contents differs from that of the previous one. Due to the shuffling method, an abundance of background images can be provided with the limited number of motion picture background images.

Figure 12:
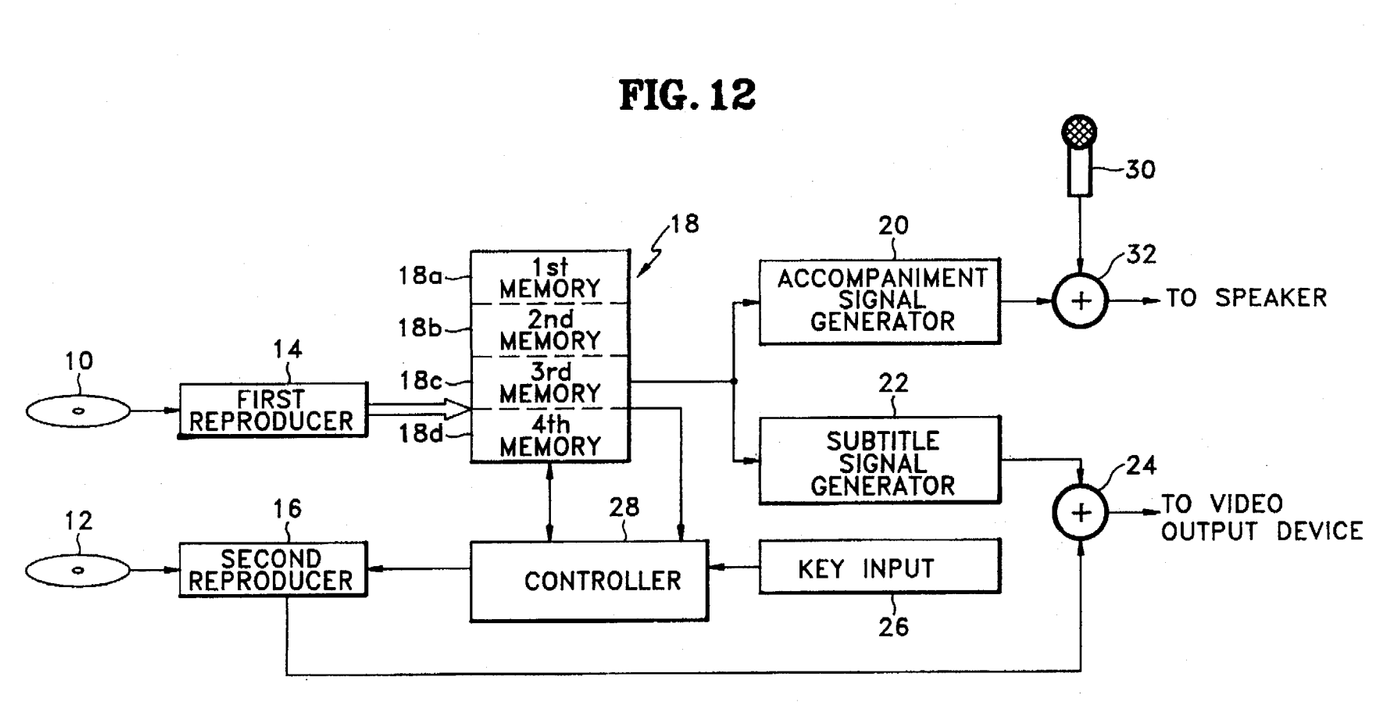
FIG. 12 is a block diagram illustrating a structure of a video-song accompaniment apparatus according to the present invention.

FIG. 12 shows a structure of a video-song accompaniment apparatus according to the present invention. The apparatus shown in FIG. 12 is comprised of a first reproducer 14, a second reproducer 16, a memory 18, an accompaniment signal generator 20, a subtitle generator 22, a mixer 24, a key input 26, and a controller 28. In FIG. 12, reference numeral 10 refers to a first disk on which a song program is written, which has a class number indicating features of accompaniment data, lyrics data, and a background image. Reference numeral 12 refers to a second disk on which various background images are written, which correspond to a class number of a song program recorded on the first disk.

First reproducer 14 reproduces a song program index table, a background image index table, a song program corresponding to the selected song, and a video program contained on first disk 10, to be stored in memory 18. Second reproducer 16 reproduces, from second disk 12, a background image corresponding to the selected song. Memory 18 includes a first memory section 18a in which the song program index table reproduced by first reproducer 14 is stored, a second memory section 18b in which the background index table is stored, a third memory section 18c in which the song program is stored, and a fourth memory section 18d in which the video program is stored. Accompaniment signal generator 20 generates an accompaniment signal according to accompaniment data provided from third memory section 18c, and subtitle signal generator 22 generates a subtitle signal according to the lyric data provided from third memory section 18c. Mixer 24 mixes and outputs the background image signal reproduced by second reproducer 16 with the subtitle signal provided by subtitle signal generator 22. Key input 26 generates a key signal for selecting a song. Controller 28 controls blocks 10 through 24, shown in FIG. 12, so as to provide an accompaniment signal, a subtitle signal, and a background image signal corresponding to the selected song.

Here, to search for the selected song referring to the lead-in area of a first disk 10 which is loaded, controller 28 stores in first memory section 18a a song program index memory written in the song program index table area, and stores in second memory section 18b a background image index table written in the background image index table area. Controller 28 obtains the start address of the selected song by referring to the song program index table written in first memory section 18a, and transmits the obtained start address to first reproducer 14. First reproducer 14 then searches for a given start address, reproduces a song program corresponding to the searched address and outputs the song program. Also, controller 28 stores in third memory section 18c the accompaniment data, lyric data and class number included in the song reproduced by first reproducer 14. Then, controller 28 reads out the accompaniment data and the lyric data written in third memory section 18c and transmits the accompaniment data and lyric data to accompaniment signal generator 20 and subtitle signal generator 22, respectively. Simultaneously, controller 28 obtains a background image number corresponding to the class number by referring to fourth memory section 18d and then transmits the number to second reproducer 16. Second reproducer 16 then searches a chapter corresponding to the allocated background image number and reproduces a background image from the searched chapter. Mixer 24 mixes the subtitle signal generated from subtitle signal generator 22 with the background image signal generated from second reproducer 16 and provides the mixed result to a video output device (not shown). Accompaniment signal generator 20 generates an accompaniment signal according to accompaniment data following the MIDI format transmitted from third memory section 18c and then provides the accompaniment signal to a speaker (not shown). Reference numeral 30 refers to a microphone, and reference numeral 32 is an audio mixer which mixes a vocal signal entered through microphone 30 with an accompaniment signal generated from accompaniment signal generator 20.

As described above, a video-song accompaniment apparatus according to the present invention uses a pair of recording medium (disks) on which a background image and a song program are stored, respectively, to provide a high-quality video and various song programs. The stored song program and background image are both associated with a specified playback method.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A recording medium for use in a video-song accompaniment apparatus, having a lead-in area, a program area and a lead-out area, comprising:
    a first disk including a program area, comprising:
        a first area in which a song program index table is recorded, said song program index table containing index information of a song program for an accompaniment;
        a second area in which a background image index table is recorded, said background image index table containing index information of at least one motion picture background images related to said song program;
        a third area in which a song program is recorded in units of songs, said song program containing accompaniment data and lyric data of a song and a class number according to a characteristic of said song; and
        a fourth area in which a video program is recorded, said video program containing index numbers of said at least one motion picture background images, wherein said index numbers identify said index information in said background image index table, and wherein said class number identifies one of said index numbers in said video program; and
    a second disk having a program area in which said at least one motion picture background images for an accompaniment are recorded in said program area corresponding to said class number, wherein said index information contained in said background image index table indicates a location of said at least one motion picture background images recorded on said second disk.

2. A recording medium for use in a video-song accompaniment apparatus as claimed in claim 1, wherein said accompaniment data, lyric data and said index numbers of said motion picture background images are all recorded in a musical instrument digital interface (MIDI) format.

3. A recording medium for use in a video-song accompaniment apparatus as claimed in claim 2, wherein said accompaniment data includes a timing code for synchronization with said lyric data.

4. A recording medium for use in a video-song accompaniment apparatus as claimed in claim 1, wherein said program area has a fifth area in which data for a warning message is recorded in a compact disc-digital audio (CD-DA) type format, wherein said fifth area follows said fourth area.

5. A recording medium for use in a video-song accompaniment apparatus as claimed in claim 1, wherein said program area has a fifth area in which sub-code channel graphics data for a warning message which is reproducible in a compact disc graphics (CDG) type format is recorded.

6. A recording medium for use in a video-song accompaniment apparatus as claimed in claim 1, wherein said second recording medium is a laser disk.

7. A recording medium for use in a video-song accompaniment apparatus as claimed in claim 1, wherein at least one of said first and second recording media is a compact disk.

8. A recording medium for use in a video-song accompaniment apparatus as claimed in claim 1, wherein said characteristic of said song is a mood of said song.

9. A video-song accompaniment apparatus which generates a subtitle signal and a background video signal with an accompaniment signal, comprising:

a first reproducer for reproducing a song program corresponding to a song selected from a first disk containing at least one song programs for accompaniment, said song program comprised of a song program index table, a video program index table, a song program and a video program;

a second reproducer for reproducing a motion picture background image corresponding to the selected song from a second disk containing at least one motion picture background images for accompaniment;

a memory in which said song program index table, said video program index table, said song program and said video program, all reproduced by said first reproducer, are recorded;

an accompaniment signal generator for generating an accompaniment signal according to lyric data among the song program recorded in said memory, and outputting the accompaniment signal to an output device;

a subtitle signal generator for generating a subtitle signal according to said lyric data among said song program recorded in said memory;

a mixer for mixing said background image signal reproduced by said second reproducer and said subtitle signal generated from said subtitle signal generator, and providing the mixed result to a video output device;

a key input unit for generating a key signal corresponding to a song selection; and a controller for storing in said memory said song program index table, said video program index table, said song program and said video program, all reproduced by said first reproducer, and for reading out said accompaniment data and said lyric data stored in said memory, to provide the read-out data to said accompaniment signal generator and said subtitle signal generator, respectively, and at the same time, for controlling said second reproducer to reproduce the background image corresponding to a background image number by reading a video program index number from said song program index table, reading a sequence of background image numbers from said video program index table which correspond to said video program index number read from said song program index table, and reading location information of the background image from said background image index table which corresponds to the background image number contained in said sequence of background image numbers read from said video program index table.

10. A video-song accompaniment apparatus as claimed in claim 9, wherein said output device is a speaker.

* * * * *